United States Patent [19]

Kawaguchi

[11] 4,227,747
[45] Oct. 14, 1980

[54] PRESSURE CONTROL DEVICE FOR A VEHICLE BRAKE

[75] Inventor: Hiroshi Kawaguchi, Mishima, Japan

[73] Assignee: Toyota Kidosha Kogyo Kabushiki Kaisha, Aichi, Japan

[21] Appl. No.: 966,328

[22] Filed: Dec. 4, 1978

[30] Foreign Application Priority Data

Mar. 15, 1978 [JP] Japan ................... 53-29632

[51] Int. Cl.² ............................................. B60T 8/26
[52] U.S. Cl. ................................... 303/24 C; 303/6 C
[58] Field of Search ............ 188/349; 303/6 C, 22 R, 303/24 A, 24 C, 24 F

[56] References Cited

U.S. PATENT DOCUMENTS 4,085,978   4/1978   Nogami .................... 303/24 C

Primary Examiner—Duane A. Reger
Attorney, Agent, or Firm—Browdy and Neimark

[57] ABSTRACT

A pressure control device for a vehicle use for controlling the braking fluid pressure in a pair of mutually independent circuits, a first and a second, to deliver the braking force produced in a dual master cylinder, to each wheel cylinder respectively disposed on a pair of rear wheels. This device is provided with an inertia valve disposed in the first circuit, a shut-off valve disposed in the second circuit, and a balance piston which is affected on either end thereof the fluid pressure coming through the inertia valve in the first circuit and the fluid pressure coming through the shut-off valve in the second circuit. The balance piston and the shut-off valve are so combined as the former be operated by the difference of the fluid pressure acting on the both ends thereof to open and close the latter for equalizing the fluid pressure in the second circuit with that in the first circuit, which is under the control of the inertiidalve.

10 Claims, 7 Drawing Figures

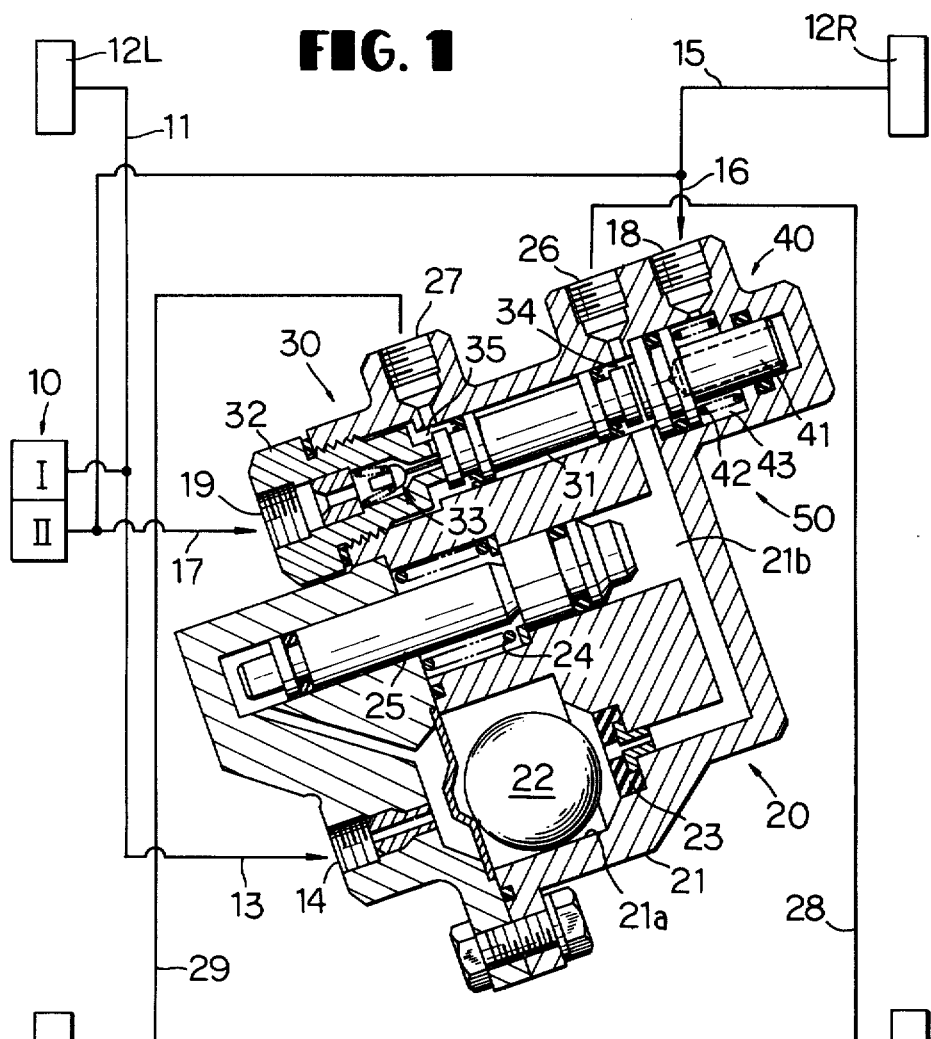
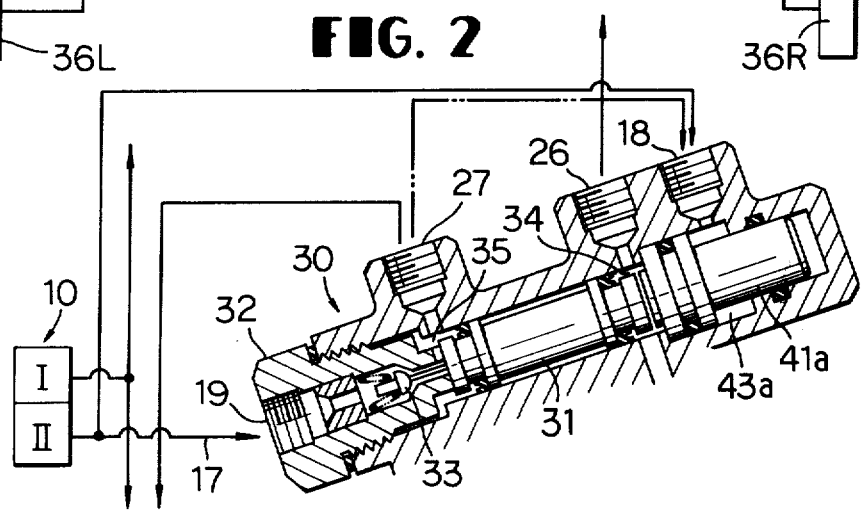

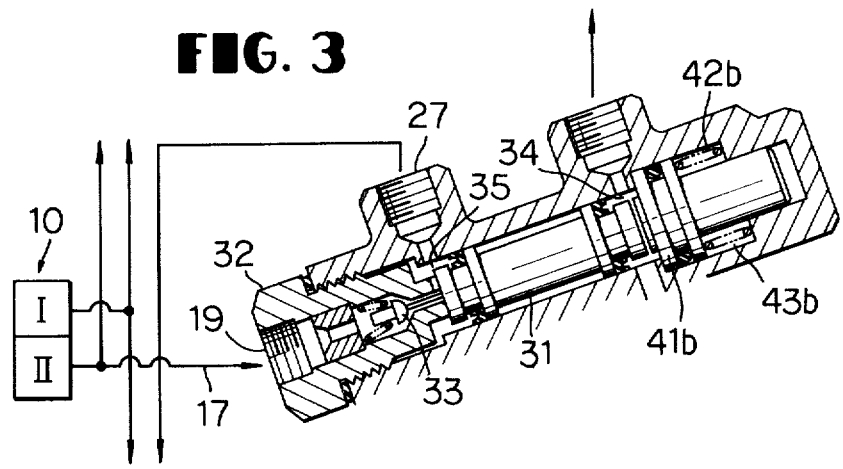
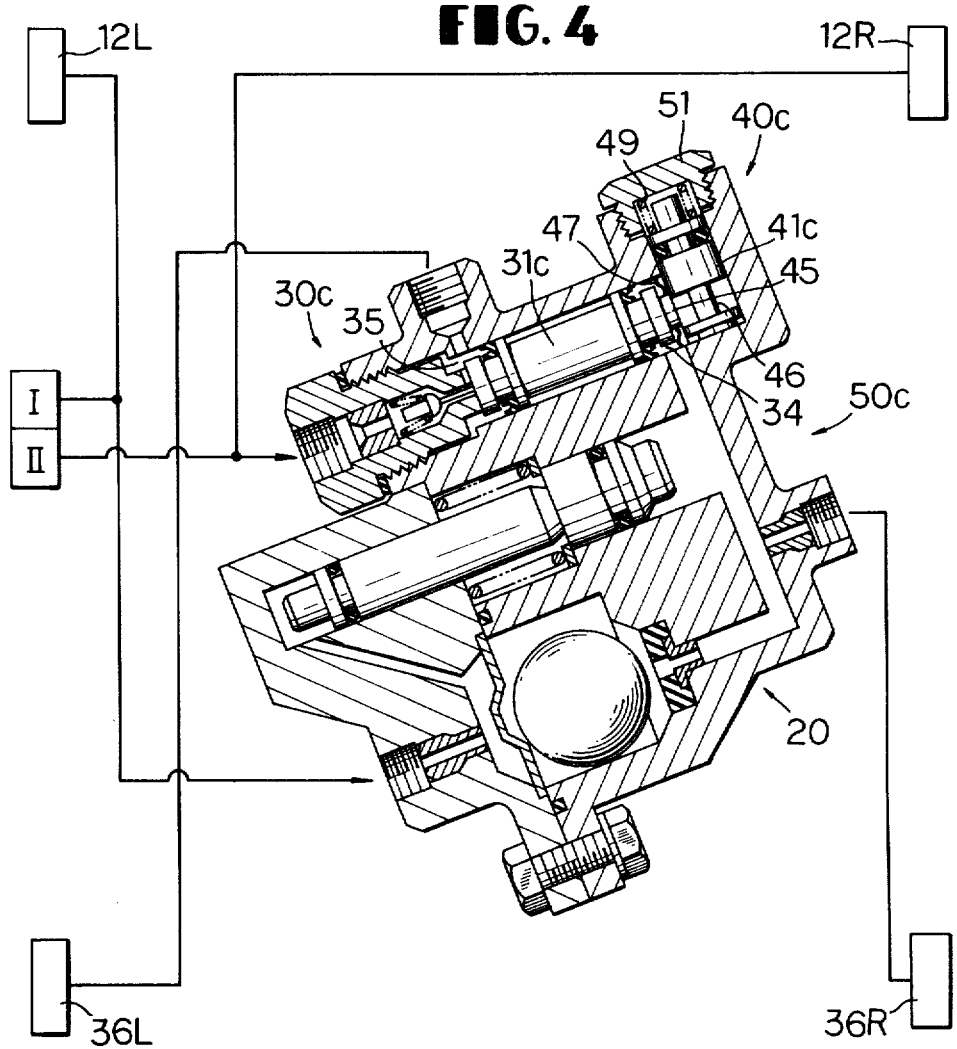

PRESSURE CONTROL DEVICE FOR A VEHICLE BRAKE

BACKGROUND OF THE INVENTION

The present invention relates to a pressure control device for a dual type hydraulic braking system of a vehicle, more particularly, to one which is capable of controlling the hydraulic pressure to the wheel cylinders in both fluid pressure circuits by utilizing one inertia valve.

It is customary in a hydraulic braking system for a vehicle to divide the whole circuit, connecting a master cylinder which produces the braking fluid pressure and wheel cylinders disposed on front- and rear wheels, into two mutually independent circuits, with the object of enhancing safety of vehicle driving.

It is also generally practiced to dispose an inertia valve, for the purpose of preventing a locking phenomenon (slipping of tyres on the ground with the wheels being in rotation-ceased condition) of both the front- and rear wheels at a moment of brake application, capable of controlling the pressure in the wheel cylinders on the rear wheels (hereinafter called rear wheel cylinder) such that the rising gradient of the pressure in the rear wheel cylinders may be milder than that in the master cylinder, when the deceleration rate of the vehicle exceeds a certain predetermined value.

The inertia valve is characterized in the capability of controlling the braking pressure due to the deceleration of a vehicle per se, but it is defective in having a large fluctutation or ununiformity of the pressure controlled. Consequently, when the both circuits are respectively provided with an individual inertia valve, the braking force acted on each rear wheel may sometimes be imbalance, causing a resultant unfavorable halting of the vehicle. The present invention was made from such a background.

SUMMARY OF THE INVENTION

It is a primary object of this invention to provide a novel pressure control device, which is capable of so controlling the hydraulic pressure to the wheel cylinders in both fluid pressure circuits as to be equal in force by utilizing one inertia valve, in place of the traditional way of controlling by disposing a pair of inertia valves one in each circuit.

For attaining this purpose the pressure control device of this invention is featured in disposing a conventional inertia valve in a first circuit and a shut-off valve in a second circuit, and in further disposing a balance piston which is provided with a first pressure-receiving face under the influence of the pressure of the first circuit coming through the inertia valve as well as a second pressure-receiving face under the influence of the pressure in the second circuit coming through the shut-off valve, both pressure-receiving faces being equal in area, and functions to open the shut-off valve when the pressure in the first circuit is higher than that in the second and to close the shut-off valve when the pressure in the second circuit is higher than that in the first.

It is another object of this invention to provide a pressure control device, wherein even when one of the dual circuits is in a failure the other circuit can remain being functional unchanged.

As a means to attain this object a lock piston is added on the pressure control device of above-mentioned structure, which lock piston is so located, while the first circuit is being affected by a predetermined pressure, in a position to allow the balance piston operating in a shut-off-valve-closing direction, and takes such a position, while the first circuit is not affected by a predetermined pressure, as to block the operation of the balance piston at least until the pressure in the second circuit reaches a predetermined height. Thus the shut-off valve can be prevented from being closed even when the first circuit is in a failure.

As an alternative means to attain the above-mentioned object, formation of a by-pass in a parallel relation with the shut-off valve can be practiced, which by-pass is provided with a by-pass valve, being usually closed, and capable of opening only when the second circuit is affected by a pressure, with the first circuit under no pressure. It enables the second circuit to be prevented from a blocking or non-communication by means of opening the by-pass valve, when the shut-off valve is closed due to a failure in the first circuit.

It is further object of this invention to provide a pressure control device capable of achieving the above-mentioned objects, at a cost inexpensive as is possible and with a structure as simple as is possible.

BRIEF DESCRIPTION OF THE DRAWINGS

FIG. 1 is an elevational cross-section of a pressure control device as a first embodiment of this invention incorporated in a braking circuit system;

FIG. 2 is an elevational cross-section of an essential part of a device as a second embodiment of this invention;

FIG. 3 is an elevational cross-section of an essential part of a device as a third embodiment of this invention;

FIG. 4 is an elevational cross-section of a device as a fourth embodiment incorporated in a braking circuit system;

FIGS. 5 and 6 are respectively a schematic plan view of other braking circuit systems where the pressure control device of this invention is applicable; and FIG. 7 is an elevational cross-section of a device as a fifth embodiment of this invention.

DETAILED DESCRIPTION OF THE PREFERRED EMBODIMENTS

Referring to the appended drawings, preferred embodiments will be described in detail hereunder. A first embodiment is an application of this invention to a so-called diagonal type dual circuit braking system. Braking pressure produced in a dual master cylinder 10, having a first and second pressure chambers I, II, in response to depressing of a not-shown brake pedal will be delivered to a pair of fluid pressure circuits. The pressure produced in the first pressure chamber I is delivered or transmitted, via a conduit 11, to a front wheel cylinder 12L disposed on the front left wheel, and is also delivered, via a conduit 13, to a port 14 on a later described pressure control device 50. The pressure in the second pressure chamber II is, on the other hand, delivered, via a conduit 15, to a front wheel cylinder 12R disposed on the front right wheel and also to a port 18 and a port 19 respectively through a conduit 16 and a conduit 17.

The pressure control device 50 is composed of an inertia valve portion 20, which is conventionally well known (hereinafter referred to as a G valve, a balance portion 30, where a same pressure to the braking pressure controlled in the G valve portion 20 is to be produced, and a piston lock portion 40, which is adapted to block the operation of the balance portion 30 for the purpose of, in the event of a failure in a circuit containing the G valve portion 20, keeping the other circuit in non-blocked condition.

The G valve portion 20 is an ordinary G valve (an inertia valve) provided with a housing 21, a deceleration-sensing ball 22 accommodated in a sloped bore ascending to the forward direction of the vehicle, a valve seat 23, and a differential piston 25 which is biased rightwardly (in FIG. 1) by a spring 24. When the deceleration of a vehicle reaches a predetermined value, the ball 22 rolls up on a slope 21a until it closely abuts the valve seat 23 to interrupt or block a fluid passage from a port 14 to a port 26. When the pressure acted on the port 14 is afterward increased further, the differential piston 25, which has once been leftwardly shifted overcoming the resilient force of the spring 24, will be pushed back rightwardly, resulting in increasing the pressure in an oil chamber 21b at a smaller rising rate than that in the first pressure chamber I.

The balance portion 30 is composed of a balance piston 31 having a pair of end faces of equal pressure-receiving area, a poppet valve 33 (a shut-off valve) disposed in a plug 32 threaded into a housing 21 so as to be moved in relation to a balance piston 31, and a first and second oil chambers 34, 35, to which both ends of the balance piston 31 are exposed. The first oil chamber 34 is affected by the pressure controlled in the G valve portion 20, and the second oil chamber 35 is under the influence of the pressure in the second pressure chamber II coming through a port 19 in the plug 32 and the poppet valve 33. The fluid pressure in the first oil chamber 34 and the second oil chamber 35 is respectively delivered, via ports 26, 27 and conduits 28, 29, to a wheel cylinder 36R on the rear right wheel and a wheel cylinder 36L on the rear left wheel.

The piston lock portion 40 is constituted of a lock piston 41, of which the pressure-receiving face exposed to the first oil chamber 34 is made larger than that on the opposite side, a spring 42 biasing the lock piston 41 in an approaching direction to the balance piston 31, a third oil chamber 43 receiving the pressure in the second pressure chamber II through a port 18. The lock piston 41 is, while the first oil chamber 34 and the third oil chamber 43 are both under low pressure, positioned such that the end surface of a large diametered portion thereof is in a close vicinity of the confronting end surface of the balance piston 31; it is, however, shifted rightwardly overcoming the resilient force of the spring 42, when both oil chambers 34, 43 are affected by predetermined amount of pressure respectively, for allowing the balance piston 31 to shift in the same direction. The sum of the force caused by the pressure acted on the third oil chamber 43 plus the resilient force of the spring 42 is so designed as to be larger than the force caused by the pressure applied on the second oil chamber 35, until the pressure acted on the second oil chamber 35 of the balance piston 31 reaches at least a predetermined amount. Consequently, when the first oil chamber 34 is no longer under pressure, the balance piston is to be prevented from shifting by the lock piston 41.

FIG. 1 shows the device in a situation wherein the brake pedal is not depressed. So the deceleration-sensing ball 22 is spaced from the valve seat 23, the lock piston 41 is at the extreme left position, making the poppet valve 33, which is to be in a relative movement with the balance piston 31, kept open. A brake pedal depressing in this situation makes a fluid pressure in the first pressure chamber I to be delivered, through the conduits 11, 13, to the front left wheel cylinder 12L and the port 14; and the pressure of the same level produced in the second pressure chamber II is delivered, through the conduits 15, 16, and 17, to the front right wheel cylinder 12R and the ports 18, 19. At this moment the balance piston 31 having the identical pressure-receiving faces is maintained motionless, because of the equally balanced fluid pressure in each of the first oil chamber 34, the second oil chamber 35, and the third oil chamber 43, but the lock piston 41 which is different in the size of pressure-receiving area on opposite pressure-receiving faces is, when the pressure in the first oil chamber 34 and the third oil chamber 43 has been raised beyond a predetermined value, rightwardly shifted resisting the spring force of the spring 42. Assume herewith that the pressure-receiving area of the lock piston 41 on the side of the first oil chamber 34 be A, the pressure-receiving area on the side of the third oil chamber 43 be B, and that the spring force of the spring 43 be f. Then the lock piston 41 will be rightwardly shifted, on condition that the pressure P of the first oil chamber 34 and the third oil chamber 43 has been raised up to the extent satisfying the following inequality, $$AP > PB + f; (A > B).$$

The fluid pressure in the first oil chamber 34 and the second oil chamber 35 is respectively delivered, through the ports 26, 27 and the conduits 28, 29, to the rear right and left wheel cylinders 36R and 36L. Therefore, the pressure produced in the master cylinder 10 is, in this situation, delivered faithfully to the front left and right wheel cylinders 12L and 12R and the rear right and left wheel cylinders 36R, 36L, i.e., to the pair of diagonal circuits.

When a predetermined deceleration has occurred due to increase of the braking pressure, the two rear wheel cylinders 36R, 36L are fed with a lower pressure than the pressure produced in the master cylinder 10. That is because of the isolation of the oil chamber 21b from the port 14 due to the close abutment of the deceleration-sensing ball 22 to the valve seat 23, which is caused by the rolling up on the slope 21a of the ball 22 of the G valve portion 20, when the deceleration of the vehicle reaches a predetermined value. The pressue in the oil chamber 21b is raised, afterwards, by way of the differential piston 25, but the rising gate of that pressure is lower or milder than that of the pressure applied to the port 14 (the difference of the rising rate is determined by the difference of the both end surfaces of the differential piston 25).

The first oil chamber 34 is thus supplied with a lower controlled pressure by the G valve portion 20 than that in the master cylinder 10, and the pressure in the first oil chamber 34 and the second oil chamber 35 are so controlled as to be constantly equal in level by the action of the balance piston 31. So the port 26 and the port 27 are always supplied with the pressure of the same level. In other words, when the pressure in the first oil chamber 34 becomes higher than that in the second oil chamber 35, the balance piston 31 is leftwardly shifted, by the difference of pressure, to open the poppet valve 33; and when the pressure in the second oil chamber 35 becomes higher, on the contrary, than that in the first oil chamber 34, the balance piston 31 is rightwardly shifted by the pressure difference for closing the poppet valve 33. The balance piston 31 is thus continuously shifted right- and leftwardly to constantly equalize the pressure in both oil chambers before it is halted by the complete balance of the pressure. The lock piston 41 takes at this moment a rightwardly biased position for not blocking the movement of the balance piston 31. Because of such a supply of controlled pressure by one G valve portion 20 to the rear left wheel cylinder 36L and the rear right wheel cylinder 36R, locking-up phenomenon does not occur on either of the rear left wheel or the rear right wheel. Furthermore, there is no pressure difference between the two circuits, i.e., one circuit connecting the front left wheel cylinder and the rear right wheel cylinder which is supplied with pressure from the first pressure chamber I and the other circuit connecting the front right and rear left wheel cylinders which is supplied with pressure from the second pressure chamber II. It assures quite a safe and stable halting of the vehicle when the brake is applied.

The above description relates to a case wherein both circuits are in normal condition. This pressure control device is characteristically effective even in case of a failure in one of the two circuits, by allowing the remaining circuit to be assured of a safety operation.

Assume a case in which a failure occured in the circuit containing the G valve portion 20, the front wheel cylinder 12R, and the ports 18, 19 are kept under the pressure from the second pressure chamber II, biasing the lock piston 41 leftwardly with the effect of blocking the balance piston 31 from moving rightwardly. The poppet valve 33 is therefore kept open, resulting in a faithful transmitting of the pressure produced in the second pressure chamber II, through the port 19, to the second oil chamber 35. This pressure is to be delevered, via the port 27 and the conduit 29, to the rear left wheel cylinder 36L, which assures a normal operation of the front right wheel cylinder and the rear left wheel cylinder. Furthermore, the upper limit of the pressure in the rear left wheel cylinder 36L can be varied at will by means of altering the pressure-receiving area of the lock piston 41 and the resilient force of the spring 42.

If the pressure-receiving area of the lock piston 41 on the side of the third oil chamber 43 is determined larger than that of the balance piston 31, both of the balance piston and the lock piston 41 are not shifted rightwardly through the whole operation, the poppet valve 33 will be consequently maintained open. The braking force applied to the left-rear wheel will not be placed under control of the pressure control device 50. If the pressure-receiving area of the lock piston 41 on the side of the third oil chamber is determined smaller than that of the balance piston 31, the balance piston 31 and the lock piston 41 are rightwardly shifted, on condition that the pressure in the second pressure chamber II is raised until the product of the difference of both pressure-receiving areas multiplied by the pressure in the second pressure chamber II overcomes the spring force of the spring 42, to close the poppet valve 33. The upper limit of the braking pressure applied to the left-rear wheel is regulated by the pressure at that time.

In the event of a failure in the circuit containing the poppet valve 33, front left wheel cylinder 12L is supplied faithfully with the pressure produced in the first pressure chamber I, and the rear right wheel cylinder 36R is supplied with the controlled pressure by the G valve portion 20.

With reference to FIG. 2, a second embodiment will be described next. This is featured in omitting the spring 42 in the previous one, by means of enlarging the pressure-receiving area of the lock piston 41a facing the third oil chamber 43a in comparison to the first embodiment. The dimension of this pressure-receiving area can be determined in the medium between the pressure-receiving area of the lock piston 41a facing the first oil chamber 34 and the pressure-receiving area of the balance piston 31 facing the second oil chamber 35. This lock piston 41a functions, while both circuits are in normal condition, to allow the movement of the balance piston 31 by means of rightwardly shifting of itself; in case of a failure in the circuit containing the G valve portion 20 it prevents the movement of the balance piston 31. In this embodiment it is also possible to deliver the fluid pressure from the second oil chamber 35 into the third oil chamber 43a, as shown in FIG. 2 with a two-dot-chain line.

With reference to FIG. 3, a third embodiment will be described hereunder. In comparison to the first embodiment it differs in that the third oil chamber 43 is changed into an air chamber 43b and a spring 42b of a larger resilient force is constantly biasing the lock piston 41b toward the balance piston 31.

As the lock piston 41b, while the both circuits are in normal condition, is affected by the pressure on its large pressure-receiving face, it can be shifted rightwardly (in FIG. 3) at a comparatively low pressure before the G valve portion 20 operates, without blocking the operation of the balance piston 31. In the event of a failure in a circuit containing the G valve portion 20, the lock piston 41b is to be shifted rightwardly by the pressure in the second oil chamber 35 acting on the balance piston 31 with a smaller pressure-receiving area, so it will not initiate its movement until the pressure in the second oil chamber 35 becomes far higher than the operation-starting pressure of the G valve portion 20. So the balance piston 31 is kept in a situation wherein the poppet valve 33 is open.

A fourth embodiment will be explained referring to FIG. 4. The pressure control device, generally designated with 50c, is composed of, just like the previous ones, the G valve portion 20, the balance portion 30c, and the piston lock portion 40c, with an exception of a different structure of the piston lock portion 40c. In the foregoing embodiments the lock piston 41, 41a, and 41b, is respectively disposed coaxially with the balance piston 31, and consequently the end surface of the lock piston is able to be in abutment on the end surface of the balance piston 31. In this embodiment the lock piston 41c is disposed in a perpendicular relation to the balance piston 31c. The lock piston 41c ascends, overcoming the resilient force of a spring 49, until it abuts on a plug 51 when the pressure in the first oil chamber 34 rises to a predetermined value. Only when a recess 46 or a cut-out portion of ring-shape formed near the bottom end of the lock piston 41c comes in alignment with the projection 45 formed on the extreme right end of the balance piston 31c, the latter is allowed to rightwardly move And the return of the balance piston 31c in the leftward direction is due to the spring force of a wave spring 47 disposed between the balance piston 31c and the lock piston 41c. This way disposition of the lock piston 41c fulfills the objects of this invention.

Additionally commenting this invention, the pressure control device of this type is also favorably applicable to a dual type braking circuit system in which a pair of front wheels and a rear wheel are communicated in one circuit and the other pair of front wheels and the other rear wheel are communicated in the other circuit, and also to still another type dual braking circuit system, being called a perfect dual type circuit, wherein two of the mutually independent braking circuits are connected to all of the front- and rear wheels.

Figures 5, 6, 7:
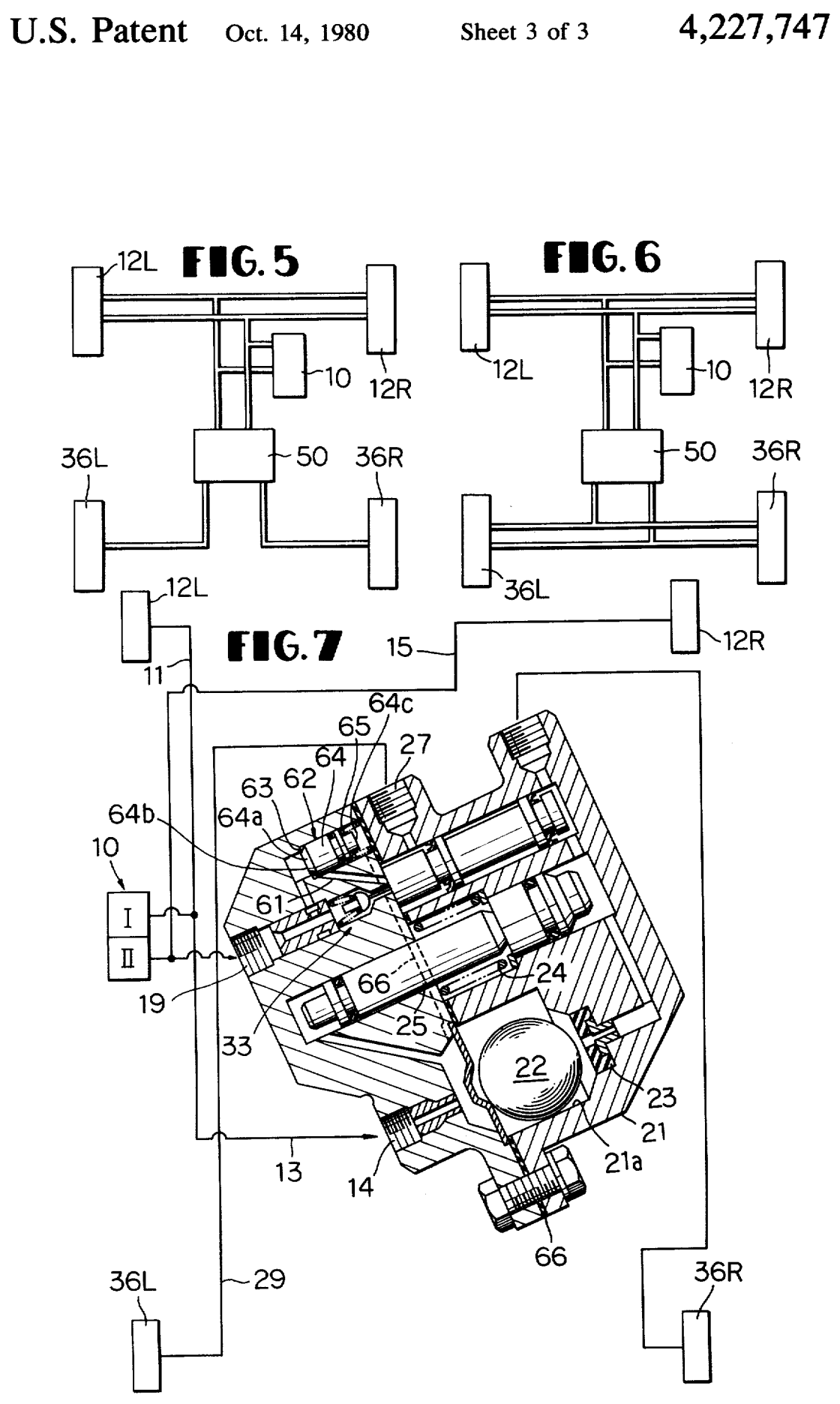

In all of the above-mentioned embodiments, when the circuit containing the G valve portion 20 gets into a trouble, the lock piston 41 (41a, 41b, or 41c) blocks the operation of the balance piston 31, (31c). So the pressure control device 50 (50c) is concurrently given, in the event of occurring a failure in the circuit containing the G valve portion 20, a capacity of preventing the other circuit from falling into a non-functioning or paralysis. The same object can be achieved as shown in FIG. 7, by means of disposing a by-pass 61 detouring the shut-off valve 33, which by-pass 61 includes a by-pass valve 62 for communicating the by-pass only when the G valve-containing circuit is faulty, blocking the by-pass 61 in normal time.

The by-pass valve 62 is provided with a valve seat 63 disposed on a housing 21, a valve piston 64 slidably accommodated, with a valve portion 64a which is confronted to the valve seat 63, in the housing 21, and a spring 65 biasing the valve piston 64 toward the valve seat 63. The valve piston 64 is, on one end surface 64b, affected by the pressure in the second circuit ranging from the shut-off valve 33 to the master cylinder 10, and on the other end surface 64c, affected by the pressure in the first circuit ranging from the G valve 20 to the master cylinder 10. This valve piston 64, while both circuits are in normal condition, is urged onto the valve seat 63 to close the by-pass 61, because the sum of the force caused by the pressure acted on the end surface 64c and the resilient force of the spring 64 is larger than the force caused by the pressure acting on the end surface 64b. When the first circuit gets into a trouble the valve piston 64 will be, overcoming the resilient force of the spring 65, moved due to the pressure acting on the end surface 64b to open the by-pass 61, because the end surface 64c is relieved of the pressure by the failure.

The G valve portion 20 is, in the above exemplified embodiments, provided with a ball or inertia body which is accommodated in a sloped bore or hole and biased to be alienated from the valve seat by the dead load. It is of course possible to employ a ball or inertia body of the type which is accommodated in a horizontal hole and biased by a spring to be alienated from the valve seat.

What is claimed is:

1. A pressure control device for a dual type vehicle brake system having a pair of first and second circuits mutually independent for delivering the braking fluid pressure produced in a master cylinder, which is provided with a pair of pressure chambers, to each wheel cylinder disposed respectively on a pair of right and left rear wheels, said pressure control device for controlling the pressure rising in each of said rear wheel cylinders, when the deceleration rate of the vehicle exceeds a predetermined value, comprising:

an inertia valve, installed in said first circuit, provided with an inertia body which is allowed to shift, resisting the biasing force, to close a passage for the braking fluid when the deceleration rate of the vehicle exceeds a predetermined value;

a shut-off valve installed in said second circuit for closing a passage for the braking fluid in said second circuit;

a housing accommodating said shut-off valve;

a balance piston, slidably accommodated in said housing, provided with a pair of first and second pressure-receiving faces, on opposite ends thereof, of identical area, said first pressure-receiving face being affected by the pressure coming through said inertia valve in said first circuit, said second pressure-receiving face being affected by the pressure coming through said shut-off valve in said second circuit, said balance piston being operated by the pressure difference between the pressure acting on said first and second pressure-receiving faces, for opening said shut-off valve when the pressure in said first circuit is higher, and for closing said shut-off valve when the pressure is said second circuit is higher.

2. A pressure control device as claimed in claim 1, wherein said inertia body in said inertia valve is accommodated in a sloped bore ascending to the forward direction of the vehicle, and biased in an alienating direction from a valve seat by the dead load of itself, for rolling up on the slope when the deceleration rate of the vehicle exceeds a predetermined value, to closely abut on said valve seat.

3. A pressure control device claimed in claim 2 further comprising a lock piston, being so positioned, while said first circuit being affected by a predetermined pressure, as to allow said balance piston to move in a shut-off-valve-closing direction, and being positioned, while said first circuit not being affected by a predetermined pressure, such that the lock piston is capable of blocking the operation of said balance piston until the pressure in said second circuit reaches at least a predetermined height, whereby closing of said shut-off valve can be prevented when said first circuit gets into a trouble.

4. A pressure control device claimed in claim 3, wherein said lock piston is disposed in said housing slidably in an axial direction of, and confronted to the first pressure-receiving face of, said balance piston, and biased by a spring toward said balance piston, and said lock piston is affected, on its large pressure-receiving face confronted to said balance piston, by the pressure in said first circuit downstream of said inertia valve toward the rear wheel cylinder, and further affected, on its small pressure-receiving face, which is smaller in area than said large pressure-receiving face on the opposite end, by the pressure in said second circuit.

5. A pressure control device claimed in claim 3, wherein said lock piston is disposed in said housing slidably in an axial direction of, and confronted to said first pressure-receiving face of, said balance piston, and said lock piston is affected, on its large pressure-receiving face, by the pressure in said first circuit downstream of said inertia valve toward the rear wheel cylinder, and further affected, on its small pressure-receiving face, which is smaller than said large pressure-receiving face on opposite end and larger in area than the second pressure-receiving face of said balance piston, by the pressure in said second circuit upstream of said shut-off valve toward said master cylinder.

6. A pressure control device claimed in claim 3, wherein said lock piston is disposed in said housing slidably in an axial direction of, and confronted to said first pressure-receiving face of, said balance piston, and said lock piston is affected, on its large pressure-receiving face, by the pressure in said first circuit downstream of said inertia valve toward the rear wheel cylinder, and further affected, on its small pressure-receiving face, which is smaller than said large pressure-receiving face on opposite end and larger in area than the second pressure-receiving face of said balance piston, by the pressure in said second circuit downstream of said shut-off valve toward the rear wheel cylinder.

7. A pressure control device claimed in claim 3, wherein said lock piston is disposed in said housing slidably in an axial direction of, and confronted to the first pressure-receiving face of, said balance piston, and biased by a spring toward said balance piston, and said lock piston is affected, on its pressure-receiving face confronted to said balance piston, by the pressure in said first circuit downstream of said inertia valve toward the rear wheel cylinder, and is exposed to an air chamber on its opposite pressure-receiving face.

8. A pressure control device claimed in claim 3, wherein said lock piston is disposed in said housing, on the side of the first pressure-receiving face of said balance piston, slidably in a perpendicular direction to the axis of said balance piston, said lock piston is affected, on one pressure-receiving face thereof, by the pressure in said first circuit downstream of said inertia valve toward the rear wheel cylinder, and is, on the other pressure-receiving face on the opposite end, exposed to an air chamber, said lock piston is biased by a spring in an alienating direction from said air chamber, and further provided with a recess on the outer periphery thereof for permitting the end portion of said balance piston to fit thereinto, when said lock piston is resisting the resilient force of said spring shifted toward said air chamber for enabling said balance piston to operate.

9. A pressure control device claimed in claim 2, further comprising a by-pass disposed in parallel with said shut-off valve, provided with a by-pass valve which is constantly closed but opened only when said second circuit is alone applied a pressure, with said first circuit being under no pressure, whereby when said first circuit gets into a trouble to close said shut-off valve, said by-pass valve is opened to maintain said second circuit in a non-blocked condition.

10. A pressure control device claimed in claim 9, wherein said by-pass valve includes a valve seat disposed in said housing, a valve piston slidably accommodated, with a valve portion corresponding to said valve seat, in said housing, and a spring biasing said valve piston toward said valve seat, and said valve piston is urged toward said valve seat by the pressure, acting on one end thereof, in said second circuit upstream of said inertia valve toward said master cylinder, and urged in an alienating direction from said valve seat by the pressure, acting on the other end thereof, in said first circuit upstream of said shut-off valve toward said master cylinder.

* * * * *